(12) United States Patent
Döring

(10) Patent No.: US 10,018,094 B2
(45) Date of Patent: Jul. 10, 2018

(54) CATALYST UNIT, METHOD FOR PRODUCING THE SAME, AND EXHAUST GAS CATALYST

(71) Applicant: MAN DIESEL & TURBO SE, Augsburg (DE)

(72) Inventor: Andreas Döring, München (DE)

(73) Assignee: MAN Diesel & Turbo SE, Augsburg (DE)

( * ) Notice: Subject to any disclaimer, the term of this patent is extended or adjusted under 35 U.S.C. 154(b) by 0 days.

(21) Appl. No.: 15/327,953

(22) PCT Filed: Jun. 11, 2015

(86) PCT No.: PCT/EP2015/001175
§ 371 (c)(1),
(2) Date: Jan. 20, 2017

(87) PCT Pub. No.: WO2016/012067
PCT Pub. Date: Jan. 28, 2016

(65) Prior Publication Data
US 2017/0204769 A1    Jul. 20, 2017

(30) Foreign Application Priority Data

Jul. 25, 2014   (DE) .................. 10 2014 010 857

(51) Int. Cl.
*F01N 3/10*    (2006.01)
*F01N 3/28*    (2006.01)
(Continued)

(52) U.S. Cl.
CPC ........... *F01N 3/2828* (2013.01); *B01D 53/94* (2013.01); *F01N 3/2853* (2013.01);
(Continued)

(58) Field of Classification Search
CPC ...... F01N 3/2853; F01N 3/286; F01N 3/2878; F01N 2450/00; F01N 2450/20
(Continued)

(56) References Cited

U.S. PATENT DOCUMENTS 3,978,567 A * 9/1976 Vroman ................. F01N 3/2853
                                                        29/890
4,343,074 A   8/1982 Bailey et al.
(Continued)

FOREIGN PATENT DOCUMENTS

DE    30 46 921    9/1981
DE    84 38 423    7/1987
(Continued)

OTHER PUBLICATIONS

Anonymous: Catalytic converter design and method of making the same, Research Disclosure, Mason Publications, Hampshire, GB, Nov. 1, 2003 XP007133099 ISSN: 0374-4656 (no copy available).
(Continued)

*Primary Examiner* — Thanh P Duong
(74) *Attorney, Agent, or Firm* — Cozen O'Connor

(57) ABSTRACT

A catalyst unit for an exhaust gas catalyst, having a ceramic catalyst body, and a metallic housing which encloses the catalyst body at least in some sections perpendicular to a gas throughflow direction. At least one bearing mat positioned between the catalyst body and the housing perpendicular to the throughflow direction. The catalyst body is retained in the housing via a force-closed press fit with the intermediate arrangement of the or each bearing mat such that, when seen in the throughflow direction of the catalyst body, the press fit between the housing and the catalyst body is formed exclusively at defined axial positions, the housing having groove-like depressions at the defined axial positions for reducing in some sections the inner cross-section of the
(Continued)

housing, and the press fit between the housing and the catalyst body being formed exclusively in the region of the groove-like depressions.

12 Claims, 2 Drawing Sheets

(51) Int. Cl.
*F01N 13/00* (2010.01)
*B01D 53/94* (2006.01)
(52) U.S. Cl.
CPC ........ *F01N 13/017* (2014.06); *F01N 2350/02* (2013.01); *F01N 2450/02* (2013.01)
(58) Field of Classification Search
USPC .......................................................... 422/179
See application file for complete search history.

(56) References Cited

U.S. PATENT DOCUMENTS

| | | | |
|---|---|---|---|
| 4,667,386 A * | 5/1987 | Enonnoto | B23P 19/04 29/33 E |
| 5,118,476 A | 2/1992 | Dryer et al. | |
| 5,094,073 A * | 3/1992 | Worner | F01N 3/2857 422/171 |
| 5,119,551 A * | 6/1992 | Abbott | F01N 3/2857 29/457 |
| 5,329,698 A | 7/1994 | Abbott | |
| 6,919,052 B2 * | 7/2005 | Foster | B01J 8/0438 422/177 |
| 2007/0033803 A1 | 2/2007 | Lawrukovich | |

FOREIGN PATENT DOCUMENTS

| | | |
|---|---|---|
| DE | 3727217 | 2/1989 |
| DE | 38 04 559 | 5/1989 |
| EP | 2902601 | 8/2015 |
| GB | 2207615 | 2/1989 |
| JP | S50 21121 | 3/1975 |
| JP | 58-113812 | 8/1983 |
| JP | 64-060711 A | 3/1989 |
| JP | 2012-251439 | 12/2012 |
| JP | 2014-066219 | 4/2014 |

OTHER PUBLICATIONS

Office Action dated Apr. 24, 2018 which issued in the corresponding Korean Patent Application No. 10-2017-7003132.

* cited by examiner

CATALYST UNIT, METHOD FOR PRODUCING THE SAME, AND EXHAUST GAS CATALYST

CROSS REFERENCE TO RELATED APPLICATIONS

This is a U.S. national stage of application No. PCT/EP2015/001175, filed on Jun. 11, 2015. Priority is claimed on German Application No. DE102014010857.0, filed Jul. 25, 2014, the content of which is incorporated here by reference.

BACKGROUND OF THE INVENTION

1. Field of the Invention

The invention relates to a catalyst unit for an exhaust gas catalytic converter. The invention, furthermore, relates to an exhaust gas catalytic converter and to a method for producing a catalyst unit for an exhaust gas catalytic converter.

2. Description of the Prior Art

Exhaust gas catalytic converters for large engines, such as for example for stationarily operated large diesel engines or diesel engines of ships typically comprise a plurality of catalyst units. Each catalyst unit comprises a ceramic catalyst body and a metallic housing through which exhaust gas flows, which at least in some portions surrounds the catalyst body seen perpendicularly to the through-flow direction of the same. The ceramic catalyst body of a catalyst unit is also described as a honeycomb and the housing of a catalyst unit also as a canning.

A ceramic catalyst body for a catalyst unit has tolerances in the range of a plurality of millimeters due to production tolerances. The metallic housings however have to have a defined outer cross section or a defined outer contour to ensure an optimal connection of the catalyst units to other assemblies of an exhaust gas system of the internal combustion engine, for example two lines conducting exhaust gas or two reactor housings. For this reason, at least one bearing mat is positioned between the catalyst body and the housing for catalytic converter, an exhaust gas catalytic converter having such a catalyst unit and a method for producing such a catalyst unit.

According to one aspect of the invention, the catalyst body is held in a force-fit manner in the housing via a press fit perpendicularly to the through-flow direction of the same subject to the intermediate arrangement of the or each bearing mat namely in such a manner that seen in through-flow direction of the catalyst body the press fit between the housing and the catalyst body is exclusively formed in defined axial positions. In the defined axial positions the housing comprises groove-like recesses for reducing the inner cross section of the housing in some sections, and wherein the press fit between the housing and the catalyst body is exclusively formed in the region of the groove-like recesses.

With the present invention it is proposed, for the first time, to hold the catalyst body of a catalyst unit, which has tolerances due to production, subject to the intermediate arrangement of at least one bearing mat via a press fit in the housing in a force-fit manner such that the press fit seen in through-flow direction of the catalyst body is exclusively formed in defined axial positions. To this end, the housing comprises groove-like recesses for the reduction of the inner cross section of the housing in some sections in the defined axial positions, wherein the press fit between the housing and the catalyst body is formed exclusively in the region of these groove-like recesses. Between the groove-like recesses the housing seen in the flow direction of the catalyst body has a defined outer cross section, as a result of which connecting the catalyst unit or an exhaust gas catalytic converter comprising at least one catalyst unit to other assemblies of an exhaust gas system of an internal combustion engine is then possible without problems.

In particular when providing an exhaust gas catalytic converter for a large engine comprising a plurality of catalyst units arranged in through-flow direction parallel next to one another, a simple connection of the exhaust gas catalytic converter to other assemblies of an exhaust gas system of the large engine is thereby possible.

According to an advantageous further development, at least one bearing mat is positioned between the catalyst body and the housing seen in through-flow direction of the catalyst body exclusively in the region of the groove-like recesses of the housing. In particular when the or each bearing mat is exclusively positioned in the region of the groove-like recesses of the housing between the catalyst body and the housing, the use of such bearing mats can be significantly reduced compared with the prior art. Because of this it is possible to reduce production costs of a catalyst unit.

According to a further advantageous further development, clearances are introduced into the housing seen in through-flow direction of the catalyst body downstream of the first groove-like recess and upstream of the last groove-like recess. Because of this it is possible to produce a catalyst unit with low weight, using little material and thus lower costs.

BRIEF DESCRIPTION OF THE DRAWINGS

Preferred further developments of the invention are obtained from the subclaims and the following description. Exemplary embodiments of the invention are explained in more detail by way of the drawing without being restricted to this.

In the drawings.

DETAILED DESCRIPTION OF THE PRESENTLY PREFERRED EMBODIMENTS

The present invention relates to a catalyst unit for an exhaust gas catalytic converter of an internal combustion engine, in particular a stationary-operation large diesel engine or a marine diesel engine.

Figure 1:
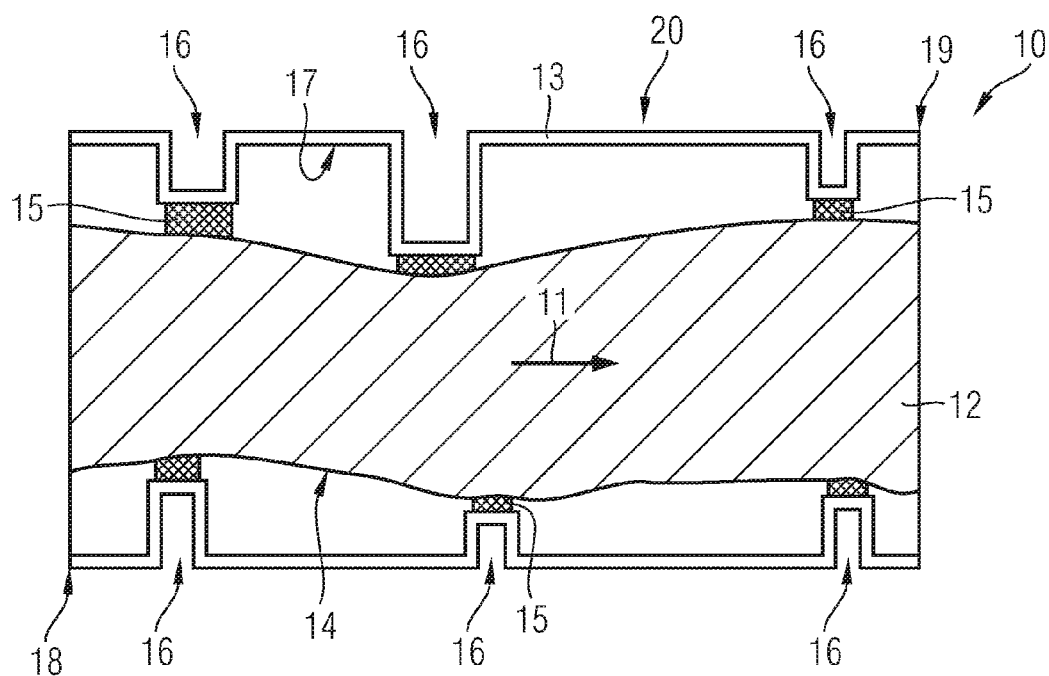
FIG. 1: is a highly schematic cross section through a catalyst unit for an exhaust gas catalytic converter.

FIG. 1 shows a highly schematic cross section through a catalyst unit 10 for an exhaust gas catalytic converter according to one aspect of the invention. The catalyst unit 10 comprises a ceramic catalyst body 12 and a metallic housing 13 through which exhaust gas flows in the through-flow direction 11, which seen perpendicularly to the through-flow direction 11 of the catalyst body 12 at least in some sections surrounds the catalyst body 12 on the outside. The ceramic catalyst body 12 is also called honeycomb and the metallic housing 13 is also described as canning. In FIG. 1, it is shown in a highly schematic and exaggerated manner that the ceramic catalyst body 12 has an outer contour or an outer cross section 14, which due to production, has tolerances that can vary seen in through-flow direction 11 of the same.

The catalyst body 12, seen perpendicularly with respect to the through-flow direction of the same, is held in a force-fit manner in the housing 13 by way of a press fit subject to the intermediate arrangement of at least one bearing mat 15 such that, seen in through-flow direction of the catalyst body 12, the press fit between the housing 13 and the catalyst body 12 is exclusively formed in defined axial positions of the catalyst body 12 or of the housing 13. For this purpose, the housing 13 comprises groove-like recesses 16 in defined axial positions via that an inner contour or an inner cross section 17 of the housing 13 can be reduced in some sections. The press fit between the housing 13 and the catalyst body 12 is exclusively formed in the region of these groove-like recesses 16, wherein seen in through-flow direction 11 of the catalyst body 12 the or each bearing mat 15 is exclusively positioned in the region of these groove-like recesses 16 between the catalyst body 12 and the housing 13.

With the configuration of the catalyst unit 10 according to one aspect of the invention it is possible to provide a catalyst unit 10 the housing 13 of which, in all axial positions which are positioned between the groove-like recesses 16, in particular in the region of a flow inlet side face end 18 and in the region of a flow outlet side face end 19 has an outer contour or an outer cross section 20 which is exactly defined and has practically no tolerance (no dimensional variation).

In particular when a plurality of such catalyst units 10 are positioned in an exhaust gas catalytic converter next to one another, the exhaust gas catalytic converter also has a defined, exactly adjusted and practically tolerance-free outer cross section or a corresponding outer contour. For this reason, connecting the exhaust gas catalytic converter to other assemblies of an exhaust gas system of an internal combustion engine is then possible without problems.

According to one aspect of the invention, the tolerance-affected outer contour 14 of a ceramic catalyst body 12 of a catalyst unit 10, which comprises a housing 13 with an exactly defined outer contour or an exactly defined outer cross section 20, accordingly is compensated in that the housing 13 in defined axial positions comprises groove-like recesses 16 that change the inner cross section 17 of the housing 13 and thus also the outer cross section of the same exclusively in defined axial positions in order to fix and thus hold the ceramic catalyst body 12 in these defined axial positions by way of a press fit in the metallic housing 13 subject to the intermediate arrangement of a bearing mat 15 exclusively in these axial positions.

In particular in the region of the flow inlet side face end 18 and the flow outlet side face end 19 and all other axial positions of the housing 13 outside the groove-like recesses 16, the same has a practically tolerance-free defined (dimensionally accurate) outer cross section 20.

Figure 2:
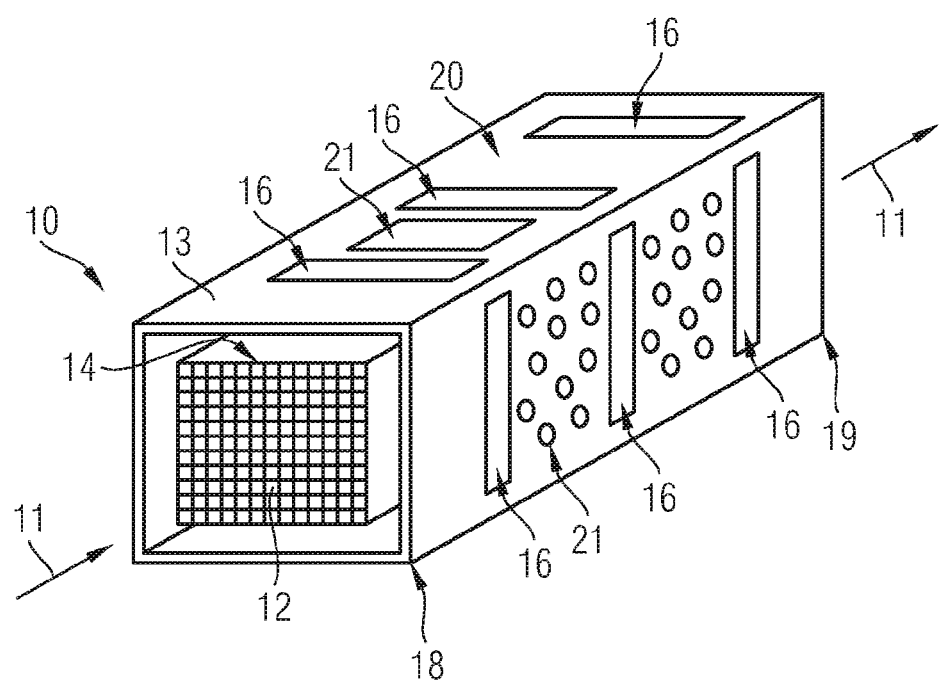
FIG. 2: is a highly schematic perspective view of a catalyst unit for an exhaust gas catalytic converter.

FIG. 2 shows a perspective view of a further development of the catalyst unit 10, wherein according to FIG. 2 in the housing 13, seen in through-flow direction 11 of the catalyst body 12, downstream of the first groove-like recess 16 and upstream of the last groove-like recess 16, clearances 21 are introduced. The clearances 21 can be round clearances or angular clearances of any dimension. Through these clearances 21, the weight of the catalyst unit 10 can be reduced. It is thereby possible, furthermore, to produce the catalyst unit 10 more cost-effectively because less material is required in the region of the metallic housing 13.

For producing a catalyst unit 10 according to one aspect of the invention, a ceramic catalyst body 12, a metallic housing 13, and at least one bearing mat 15 are initially provided. Following this, the ceramic catalyst body 12 together with the or each bearing mat 15 is arranged in the metallic housing 13 and the press fit between the housing 13 and a catalyst body 12 formed in defined axial positions.

The approach to this procedure can be such that a housing 13 with groove-like recesses 16 are provided in defined axial positions, wherein the inner cross section 17 of the housing 13 in the region of the groove-like recesses 16 is already smaller than the outer cross section of the catalyst body 13 surrounded by the or each bearing mat 15 in those axial positions in which the press fit between the housing 13 and the catalyst body 12 is to be formed. During the arrangement of the catalyst body 12 and the or each bearing mat 15 in the housing 13 the press fit then automatically forms between the housing 13 and the catalyst body 12 in the region of the groove-like recesses 16.

This procedure for producing the catalyst unit 10 is opportune in particular when, as shown in FIGS. 1 and 2, both the catalyst body 12 and also the housing 13 are rectangular in cross section.

In this case, a housing 13, which is initially open on a longitudinal wall (or arc of a circle) can then be provided to arrange the catalyst body 12 together with the or each bearing mat 15 in the housing 13 and subsequently in the region of the open longitudinal housing 13 position a wall of the same and to connect the same with the other walls of the housing 13 in a fixed manner for example by welding. By joining the housing 13 the press fit between the housing 13 and the catalyst body 12 is then automatically obtained in the defined axial positions of the groove-like recesses 16.

The above procedure however can only be employed when a catalyst unit with a ceramic catalyst body that is round in cross section and a metallic housing that is rectangular or round in cross section is provided.

In this case it is then possible for example to assemble the tubular housing 13 which is round in cross section, which already comprises groove-like recesses, from two half shells wherein the catalyst body 12 is initially placed into a first half shell of the housing 13 in order to subsequently fit the second half shell and connect the same in a fixed manner to the first half shell, into which the catalyst body 12 was previously inserted, for example by welding.

Here, too, the press fit between the housing 13 and the catalyst body 12 is then automatically formed in the defined axial positions of the groove-like recesses 16 of the housing 13.

According to a second version of the invention, the catalyst unit 10 can be provided in that a housing 13 with groove-like recesses 16 provided in defined axial positions, wherein the inner cross section 17 of the housing 13 in the region of the groove-like recesses 16 is even larger than the outer cross section of the catalyst body 12 surrounded by the or each bearing mat 15 in those axial positions in which the press fit between the housing 13 and the catalyst body 12 is to be formed. Following the arranging of the catalyst body 12 in the housing 13 together with the or each bearing mat 15 the housing 13 is then compressed in some sections in the region of the groove-like recesses subject to forming the press fit between the housing 13 and the catalyst body 12, i.e. only in the region of the groove-like recesses 16, so that between the groove-like recesses 16 the defined outer contour or the defined outer cross section 20 of the housing 13 remains unchanged.

With this procedure, the catalyst body 12 is preferentially measured in those axial positions in which the press fit with the groove-like recesses 16 of the housing 13 is to be formed in order to thereby exactly determine in advance the dimension by which the groove-like recesses 16 are to be compressed through force effect together with the or each bearing mat 15 in the housing 13 following the arranging of the catalyst body 12.

According to a further version, the catalyst unit 10 can be provided in that initially a housing without groove-like recesses is provided. The inner cross section 17 of such a housing 13 is then larger than the outer cross section of the catalyst body 12 surrounded by the or each bearing mat 15. Following the arranging of the catalyst body 12 and the or each bearing mat 15 in the housing 13, the housing 13 in some sections is compressed in the region of the groove-like recesses 16 subject to forming groove-like recesses 16 subject to forming the press fit between the housing 13 and the catalyst body 12.

With this version, a higher force for compressing the housing is necessary since the groove-like recesses 16 still have to be formed in the defined axial positions of the housing 13. In this case, supporting of the housing 13 in the region of the flow inlet side face end 18 and the flow outlet side face end 19 is then required in particular in order to prevent deforming the defined outer contour or the defined outer cross section 20 of the housing 13 outside the groove-like recesses 16.

The purpose of the present invention therefore is to produce, on a catalyst unit 10, which comprises a ceramic catalyst body 12 and a metallic housing 13, the metallic housing 13 in some sections via groove-like recesses 16 in order to thereby provide crimping of the housing 13 with the catalyst body 12 in the region of the recesses 16. Outside these groove-like recesses 16 the defined outer cross section 20 of the housing 13 remains unchanged. Then, integrating the catalyst unit 10 in an exhaust gas catalytic converter and connecting the exhaust gas catalytic converter to other assemblies of an exhaust gas system of an internal combustion engine is then possible without problems. Because of the fact that the press fit between the housing 13 and the catalyst body 12 is exclusively formed in the region of the groove-like recesses 16 a bearing mat 15 that is continuous seen in through-flow direction or in axial direction can be omitted. Accordingly, the bearing mat 15 exclusively surrounds the catalyst body 12 in the region in which the press fit between the catalyst body 12 and the metallic housing 13 is formed. Furthermore, clearances in the form of holes and/or slots can be introduced into the housing 13 seen in axial direction as a result of which the weight and the material costs for the metallic housing 13 and thus ultimately for the catalyst unit can be further reduced.

The outlet and/or inlet of the housing 13 can be calibrated to a defined dimension with respect to the outer dimensions by forming, in particular crimping or widening.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with a y disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A catalyst unit for an exhaust gas catalytic converter, comprising:
    a ceramic catalyst body through which exhaust gas flows;
    a metallic housing, which seen perpendicularly to a through-flow direction of the ceramic catalyst body surrounds the ceramic catalyst body at least in some sections;
    at least one bearing mat positioned between the ceramic catalyst body and the metallic housing viewed perpendicularly with respect to the through-flow direction of the ceramic catalyst body;
    wherein the at least one bearing mat is held via a press fit in a force-fit manner in the metallic housing such that seen in the through-flow direction of the ceramic catalyst body the press fit between the metallic housing and the ceramic catalyst body is exclusively formed in defined axial positions,
    wherein the metallic housing, in the defined axial positions, comprises groove-like recesses for reducing in some sections an inner cross section of the metallic housing and wherein the press fit between the metallic housing and the ceramic catalyst body is exclusively formed in a region of the groove-like recesses.

2. The catalyst unit according to claim 1, wherein the at least one bearing mat is positioned between the ceramic catalyst body and the metallic housing exclusively in the region of the groove-like recesses of the metallic housing in through-flow direction of the ceramic catalyst body.

3. The catalyst unit according to claim 1, wherein in through-flow direction of the ceramic catalyst body the metallic housing seen has a defined outer cross section between the groove-like recesses.

4. The catalyst unit according to claim 1, wherein clearances are introduced into the metallic housing downstream of the first groove-like recess and upstream of a last groove-like recess seen in through-flow direction of the ceramic catalyst body.

5. The catalyst unit according to claim 1, wherein bearing mats are inserted only in regions of the groove-like recesses.

6. An exhaust gas catalytic converter comprising a plurality of catalyst units, each comprising:
    a ceramic catalyst body through which exhaust gas flows;
    a metallic housing, which seen perpendicularly to a through-flow direction of the ceramic catalyst body surrounds the ceramic catalyst body at least in some sections;
    at least one bearing mat positioned between the ceramic catalyst body and the metallic housing viewed perpendicularly with respect to the through-flow direction of the ceramic catalyst body;
    wherein the at least one bearing mat is held via a press fit in a force-fit manner in the metallic housing such that seen in through-flow direction of the ceramic catalyst body the press fit between the metallic housing and the ceramic catalyst body is exclusively formed in defined axial positions,
    wherein the metallic housing, in the defined axial positions, comprises groove-like recesses for reducing in some sections an inner cross section of the metallic housing and wherein the press fit between the metallic housing and the ceramic catalyst body is exclusively formed in a region of the groove-like recesses.

7. A method for producing a catalyst unit having:
    a ceramic catalyst body through which exhaust gas flows;

a metallic housing, which seen perpendicularly to a through-flow direction of the ceramic catalyst body surrounds the ceramic catalyst body at least in some sections;

at least one bearing mat positioned between the ceramic catalyst body and the metallic housing viewed perpendicularly with respect to the through-flow direction of the ceramic catalyst body;

wherein the at least one bearing mat is held via a press fit in a force-fit manner in the metallic housing such that seen in through-flow direction of the ceramic catalyst body the press fit between the metallic housing and the ceramic catalyst body is exclusively formed in defined axial positions, wherein the metallic housing, in the defined axial positions, comprises groove-like recesses for reducing in some sections an inner cross section of the metallic housing and wherein the press fit between the metallic housing and the ceramic catalyst body is exclusively formed in a region of the groove-like recesses, the method comprising:
a) providing the ceramic catalyst body;
b) providing the metallic housing;
c) providing the at least one bearing mat;
d) arranging the ceramic catalyst body and the at least one bearing mat in the metallic housing subject to forming the press fit between the metallic housing and the ceramic catalyst body.

8. The method according to claim 7,
wherein the metallic housing comprises groove-like recesses in defined axial positions,
wherein the inner cross section of the metallic housing in the region of the groove-like recesses is smaller than an outer cross section of the ceramic catalyst body surrounded by the at least one bearing mat in those axial positions in which the press fit between the metallic housing and the ceramic catalyst body is to be formed, so that when the ceramic catalyst body and the at least one bearing mat are arranged in the metallic housing the press fit between the metallic housing and the ceramic catalyst body automatically forms.

9. The method according to claim 7,
wherein the metallic housing comprises groove-like recesses in defined axial positions,
wherein the inner cross section of the metallic housing in the region of the groove-like recesses is larger than an outer cross section of the ceramic catalyst body surrounded by the at least one bearing mat in those axial positions in which the press fit between the metallic housing and the ceramic catalyst body is to be formed,
wherein after the arranging of the ceramic catalyst body and of the or each bearing mat in the metallic housing, the metallic housing in the region of the groove-like recesses is compressed in some sections and thus plastically deformed subject to forming the press fit between the metallic housing and the ceramic catalyst body.

10. The method according to claim 7,
wherein the metallic housing is provided without groove-like recesses,
wherein the inner cross section of the metallic housing is larger than an outer cross section of the ceramic catalyst body surrounded by the at least one bearing mat,
wherein following arrangement of the ceramic catalyst body and of the at least one bearing mat in the metallic housing, the metallic housing in some sections is compressed subject to forming the groove-like recesses and subject to forming the press fit between the metallic housing and the ceramic catalyst body.

11. The method according to claim 7, wherein outer dimensions of the metallic housing in an inlet and outlet region is calibrated to a defined dimension.

12. The method according to claim 7, wherein outer dimensions are defined by crimping or widening.

* * * * *